(12) United States Patent
Liu et al.

(10) Patent No.: US 11,810,389 B2
(45) Date of Patent: Nov. 7, 2023

(54) FINGERPRINT RECOGNITION SUBSTRATE, DRIVING METHOD THEREOF AND DISPLAY DEVICE

(71) Applicants: Beijing BOE Display Technology Co., Ltd., Beijing (CN); BOE Technology Group Co., Ltd., Beijing (CN)

(72) Inventors: Yi Liu, Beijing (CN); Shijun Wang, Beijing (CN); Wenkai Mu, Beijing (CN); Bo Feng, Beijing (CN); Xinlan Yang, Beijing (CN); Yang Wang, Beijing (CN); Zhan Wei, Beijing (CN); Tengfei Ding, Beijing (CN); Jun Fan, Beijing (CN); Chengfu Xu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 150 days.

(21) Appl. No.: 17/419,909

(22) PCT Filed: Sep. 29, 2020

(86) PCT No.: PCT/CN2020/118871
§ 371 (c)(1),
(2) Date: Jun. 30, 2021

(87) PCT Pub. No.: WO2022/067516
PCT Pub. Date: Apr. 7, 2022

(65) Prior Publication Data
US 2022/0319221 A1 Oct. 6, 2022

(51) Int. Cl.
*G06V 40/13* (2022.01)
*G06F 3/041* (2006.01)
*G06F 3/044* (2006.01)

(52) U.S. Cl.
CPC ........ *G06V 40/1306* (2022.01); *G06F 3/0412* (2013.01); *G06F 3/0446* (2019.05); *G06F 3/04164* (2019.05); *G06F 3/04166* (2019.05)

(58) Field of Classification Search
None
See application file for complete search history.

(56) References Cited

FOREIGN PATENT DOCUMENTS

| CN | 105205440 A | 12/2015 |
|---|---|---|
| CN | 110263750 A | 9/2019 |

(Continued)

*Primary Examiner* — Nicholas J Lee
(74) *Attorney, Agent, or Firm* — Nath, Goldberg & Meyer; Joshua B. Goldberg

(57) ABSTRACT

The present disclosure provides fingerprint recognition substrate including fingerprint recognition units arranged in array, signal reading line groups and gating circuits, fingerprint recognition units are divided into first fingerprint recognition groups arranged along row direction, first fingerprint recognition groups, signal reading line groups and gating circuits are in one-to-one correspondence with one another; first fingerprint recognition group includes fingerprint recognition units consecutively arranged in row direction, signal reading line group includes signal reading lines each coupled to corresponding column of fingerprint recognition units; gating circuit includes switch circuits each coupled to one signal transmission channel on signal receiving unit through corresponding switch circuit; among all signal reading lines, different signal reading lines in same signal reading line group are coupled to different signal transmission channels, and at least two signal reading lines in different signal reading line groups are coupled to same signal transmission channel.

13 Claims, 6 Drawing Sheets

(56) References Cited

FOREIGN PATENT DOCUMENTS

| | | |
|---|---|---|
| CN | 110851024 A | 2/2020 |
| CN | 111124184 A | 5/2020 |
| CN | 111160287 A | 5/2020 |

FINGERPRINT RECOGNITION SUBSTRATE, DRIVING METHOD THEREOF AND DISPLAY DEVICE

CROSS-REFERENCE TO RELATED APPLICATION

This is a National Phase Application filed under 35 U.S.C. 371 as a national stage of PCT/CN2020/118871, filed on Sep. 29, 2020, the contents of which are incorporated herein in their entirety by reference.

TECHNICAL FIELD

The present disclosure relates to the field of display technology, and particularly relates to a fingerprint recognition substrate, a driving method thereof, and a display device.

BACKGROUND

Fingerprint recognition technology is widely used in various fields for protecting personal information security, especially in the field of display technology, such as mobile phones, notebook computers, tablet computers, digital cameras, and the like. A fingerprint recognition unit is the minimum unit among fingerprint recognition devices, and the fingerprint recognition unit transmits an obtained fingerprint signal to a signal receiving unit (for example, fingerprint recognition IC) through a signal reading line so that the signal receiving unit recognizes valleys and ridges of a fingerprint according to the fingerprint signal. At present, it is a conventional arrangement that one column of fingerprint recognition units corresponds to one signal reading line, one signal reading line is coupled to one signal transmission channel in the signal receiving unit, and the signal reading lines are in one-to-one correspondence with the signal transmission channels.

However, with the increase of application scenarios of fingerprint recognition, the requirements on full screen and precision of fingerprint recognition gradually increase, and the numbers of the fingerprint recognition units and the signal reading lines which need to be arranged in a display device correspondingly increase; accordingly, the number of the signal transmission channels which need to be arranged in the signal receiving unit increases, so the difficulty in development of the signal receiving unit increases and the cost increases.

SUMMARY

The present disclosure provides a fingerprint recognition substrate, a driving method thereof and a display device.

In a first aspect, an embodiment of the present disclosure provides a fingerprint recognition substrate including: a plurality of fingerprint recognition units arranged in an array, a plurality of signal reading line groups and a plurality of gating circuits, wherein the plurality of fingerprint recognition units are divided into a plurality of first fingerprint recognition groups arranged along a row direction, the plurality of first fingerprint recognition groups are in one-to-one correspondence with the plurality of signal reading line groups, and the plurality of signal reading line groups are in one-to-one correspondence with the plurality of gating circuits;

the first fingerprint recognition group includes: a plurality of columns of fingerprint recognition units consecutively arranged in the row direction, the signal reading line group includes: a plurality of signal reading lines which are in one-to-one correspondence with the plurality of columns of fingerprint recognition units in a corresponding first fingerprint recognition group, and the signal reading line is coupled to a corresponding column of fingerprint recognition units;

the gating circuit includes: a plurality of switch circuits which are in one-to-one correspondence with the plurality of signal reading lines in a corresponding signal reading line group, each signal reading line is coupled to one signal transmission channel on a signal receiving unit through a corresponding switch circuit, and the switch circuit is configured to control connection/disconnection between the signal reading line and the signal transmission channel coupled to the switch circuit; and among all the signal reading lines, different signal reading lines in a same signal reading line group are coupled to different signal transmission channels, and at least two signal reading lines in different signal reading line groups are coupled to a same signal transmission channel.

In some embodiments, the signal transmission channels on the signal receiving unit are divided into at least two signal transmission channel groups, each signal reading line group corresponds to one signal transmission channel group, and a number of the signal transmission channels in the signal transmission channel group is greater than a number of the signal reading lines in the signal reading line group corresponding to the signal transmission channel group.

In some embodiments, a number of columns of the fingerprint recognition units in each first fingerprint recognition group is the same; and
a number of the signal reading lines in each signal reading line group is the same.

In some embodiments, the plurality of the signal reading line groups are arranged in sequence in the row direction, and the at least two signal transmission channel groups include: a first signal transmission channel group and a second signal transmission channel group;
an odd-numbered signal reading line group corresponds to the first signal transmission channel group; and
an even-numbered signal reading line group corresponds to the second signal transmission channel group.

In some embodiments, all of the plurality of signal reading lines in each signal reading line group are arranged in sequence in the row direction;
in all the odd-numbered signal reading line groups, the signal reading lines having a same sequence number are coupled to a same signal transmission channel in the first signal transmission channel group; and
in all the even-numbered signal reading line groups, the signal reading lines having a same sequence number are coupled to a same signal transmission channel in the second signal transmission channel group.

In some embodiments, a number of the signal transmission channels in each signal transmission channel group is the same.

In some embodiments, the plurality of switch circuits in a same gating circuit are coupled to a same control signal line, and the switch circuits in different gating circuits are coupled to different control signal lines; and
the plurality of switch circuits in the same gating circuit are configured to be simultaneously turned on or off under control of a control signal provided by the same control signal line.

In some embodiments, the switch circuit includes: a switching transistor;
   a control electrode of the switching transistor is coupled to a corresponding control signal line, a first electrode of the switching transistor is coupled to a corresponding signal reading line and a second electrode of the switching transistor is coupled to a corresponding signal transmission channel.

In some embodiments, the plurality of fingerprint recognition units are divided into a plurality of second fingerprint recognition groups arranged along a column direction, and the fingerprint recognition substrate further includes: a plurality of gate driving circuits and a plurality of scan driving line groups, the plurality of second fingerprint recognition groups are in one-to-one correspondence with the plurality of scan driving line groups, and the plurality of scan driving line groups are in one-to-one correspondence with the plurality of the gate driving circuits;
   the second fingerprint recognition group includes: a plurality of rows of fingerprint recognition units consecutively arranged in the column direction, the scan driving line group includes: a plurality of scan driving lines which are in one-to-one correspondence with the plurality of rows of fingerprint recognition units in a corresponding second fingerprint recognition group, and the scan driving line is coupled to a corresponding row of fingerprint recognition units; and
   the gate driving circuit includes: a plurality of cascaded shift registers in one-to-one correspondence with the plurality of scan driving lines in a corresponding scan driving line group, and a signal output terminal of the shift register is coupled to a corresponding scan driving line.

In some embodiments, all of the plurality of scan driving line groups are sequentially arranged in the column direction; and
   the gate driving circuit coupled to an odd-numbered scan driving line group are at a first side of a corresponding scan driving line group, the gate driving circuit coupled to an even-numbered scan driving line group is at a second side of a corresponding scan driving line group, and the first side and the second side are opposite sides of the scan driving line group in the row direction.

In some embodiments, a number of rows of the fingerprint recognition units in each second fingerprint recognition group is the same; and
   a number of the scan driving lines in each scan driving line group is the same.

In a second aspect, an embodiment of the present disclosure further provides a display device, including: the fingerprint recognition substrate as provided in the first aspect above.

In a third aspect, an embodiment of the present disclosure further provides a fingerprint recognition driving method based on a fingerprint recognition substrate, the fingerprint recognition substrate is the fingerprint recognition substrate provided in the first aspect, each first fingerprint recognition group has a corresponding fingerprint recognition region, and the driving method includes:
   turning on all the switch circuits in the gating circuit corresponding to the first fingerprint recognition group having the fingerprint recognition region overlapping with a fingerprint area, and transmitting, by the switch circuits in a turned-on state, detection signals in the signal reading lines coupled to the switch circuits to corresponding signal transmission channels.

In some embodiments, all of the plurality of fingerprint recognition units are divided into a plurality of second fingerprint recognition groups arranged along a column direction, and the fingerprint recognition substrate further includes: a plurality of gate driving circuits and a plurality of scan driving line groups, and the driving method further includes:
   operating all the gate driving circuits to start scan driving synchronously.

DETAILED DESCRIPTION

In order to make those of ordinary skill in the art better understand the technical solutions of the present disclosure, a fingerprint recognition substrate, a driving method thereof, and a display device according to the present disclosure are described in detail below with reference to the accompanying drawings.

Figure 1:
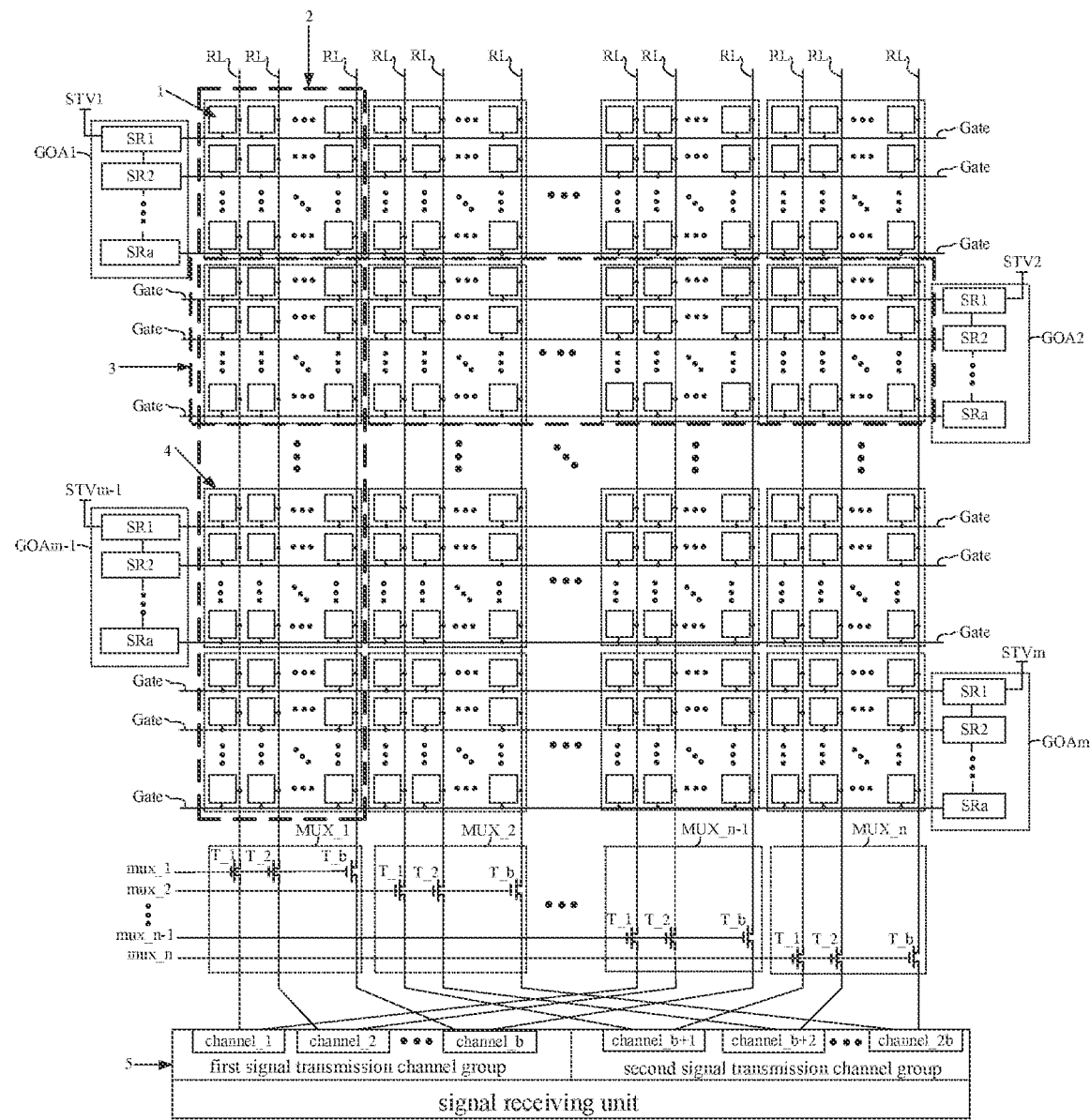
FIG. 1 is a schematic diagram of a circuit structure of a fingerprint recognition substrate according to an embodiment of the present disclosure.
Figure 2:
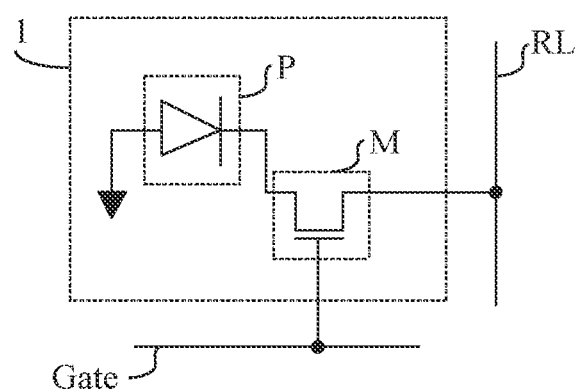
FIG. 2 is a schematic diagram of a circuit structure of a fingerprint recognition unit in an embodiment of the present disclosure.
Figure 3:
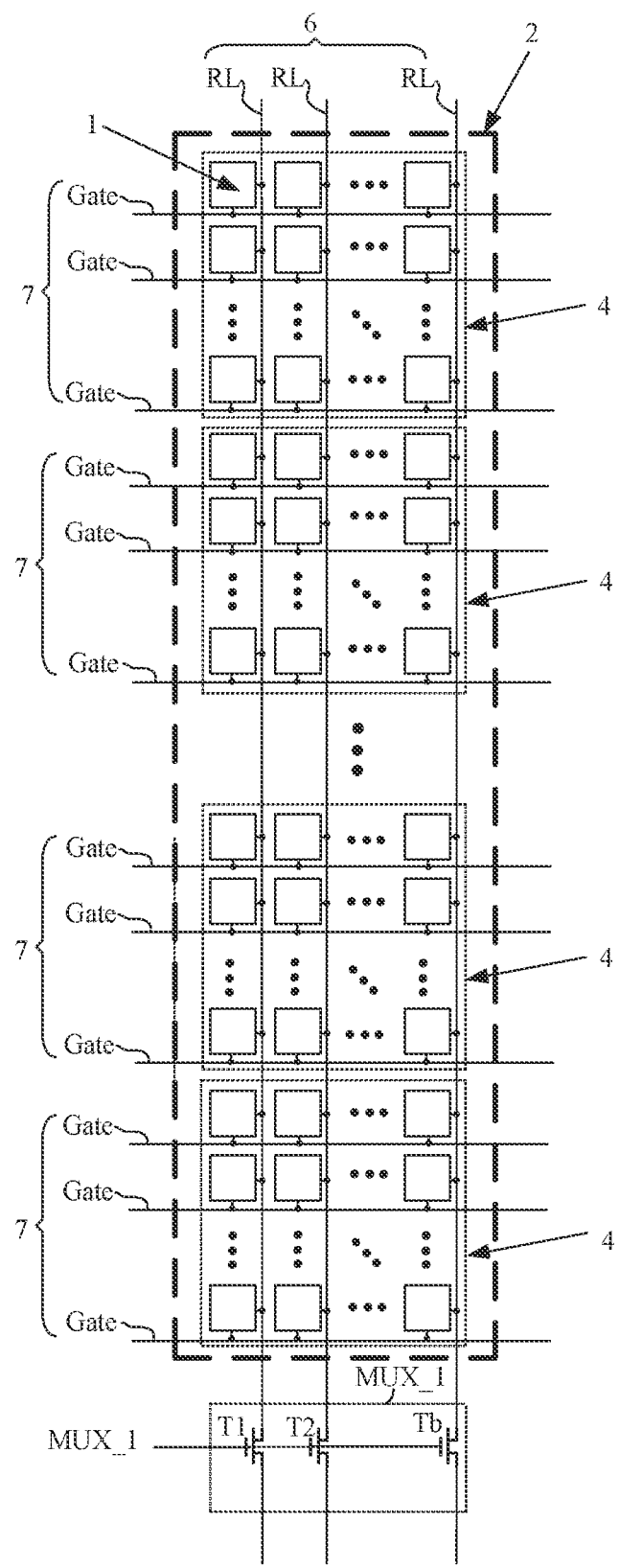
FIG. 3 is a schematic diagram of a circuit structure of a first fingerprint recognition group and a signal reading line group and a gating circuit corresponding to the first fingerprint recognition group in an embodiment of the present disclosure.
Figure 4:
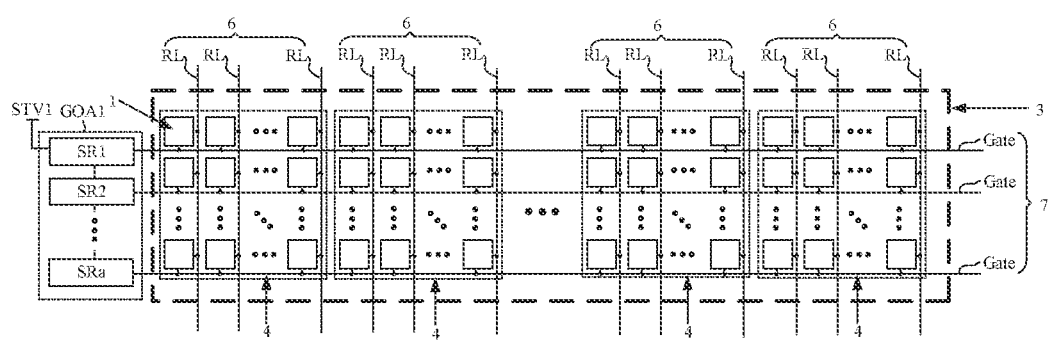
FIG. 4 is a schematic diagram of a circuit structure of a second fingerprint recognition group and a scan driving line group and a gate driving circuit corresponding to the second fingerprint recognition group in an embodiment of the present disclosure.

FIG. 1 is a schematic diagram of a circuit structure of a fingerprint recognition substrate according to an embodiment of the present disclosure, FIG. 2 is a schematic diagram of a circuit structure of a fingerprint recognition unit in an embodiment of the present disclosure, FIG. 3 is a schematic diagram of a circuit structure of a first fingerprint recognition group and a signal reading line group and a gating circuit corresponding to the first fingerprint recognition group in an embodiment of the present disclosure, and FIG. 4 is a schematic diagram of a circuit structure of a second fingerprint recognition group and a scan driving line group and a gate driving circuit corresponding to the second fingerprint recognition group in an embodiment of the present disclosure. As shown in FIGS. 1 to 4, the fingerprint recognition substrate includes: a plurality of fingerprint recognition units 1 arranged in an array, a plurality of signal reading line groups 6 and a plurality of gating circuits MUX_1~MUX_n. The plurality of fingerprint recognition units 1 are divided into a plurality of first fingerprint recognition groups 2 arranged along a row direction, the plurality of first fingerprint recognition groups 2 are in one-to-one correspondence with the plurality of signal reading line groups 6, and the plurality of signal reading line groups 6 are in one-to-one correspondence with the plurality of gating circuits MUX_1~MUX_n.

The first fingerprinting group 2 includes: a plurality of columns of fingerprint recognition units 1 consecutively arranged in the row direction, the signal reading line group 6 includes: a plurality of signal reading lines RL which are in one-to-one correspondence with the plurality of columns of fingerprint recognition units 1 in a corresponding first fingerprint recognition group 2, and each signal reading line RL is coupled to a corresponding column of fingerprint recognition units 1.

Each of the gating circuits MUX_1~MUX_n includes: a plurality of switch circuits T_1~T_b in one-to-one correspondence with the plurality of signal reading lines RL in a corresponding signal reading line group 6, each signal reading line RL is coupled to one of the signal transmission channels channel_1~channel_2b on a signal receiving unit 5 through a corresponding one of the switch circuits T_1~T_b, and the switch circuits T_1~T_b are each configured to control connection/disconnection between the signal reading line RL and one of the signal transmission channels channel_1~channel_2b connected thereto. The signal receiving unit 5 may be a fingerprint recognition IC.

Among all of the signal reading lines RL, different signal reading lines RL in a same signal reading line group 6 are coupled to different signal transmission channels, and at least two signal reading lines RL in different signal reading line groups 6 are coupled to a same signal transmission channel. It should be noted that, in the embodiment of the present disclosure, the expression that "the signal reading line RL is coupled to the corresponding signal transmission channel" specifically means that the signal reading line RL is electrically coupled to the corresponding signal transmission channel through one of the configured switch circuits T_1~T_b, and does not mean that the signal reading line RL is directly coupled to the corresponding signal transmission channel.

The fingerprint recognition unit 1 is the minimum unit in the fingerprint recognition process and can be used for recognizing the valleys and ridges of a part of a fingerprint directly opposite to the fingerprint recognition unit 1. As shown in FIG. 2, in some embodiments, the fingerprint recognition unit 1 is an optical fingerprint recognition unit including: a transistor M and a photodiode P. A control electrode of the transistor M is coupled to a scan driving line Gate of a corresponding row, a first electrode of the transistor M is coupled to the photodiode P, a second electrode of the transistor M is coupled to a signal reading line RL of a corresponding column, and the photodiode P has a PIN structure which can produce a photoelectric effect. In this case, when the scan driving line Gate receives a scan driving signal, the signal reading line RL is applied with a high voltage to reversely bias the photodiode P. At this time, when a finger contacts the fingerprint recognition substrate, light from a backlight source passes through the fingerprint recognition substrate to arrive at the surface of the finger and is reflected to the photodiode P by the surface of the finger. The stronger the light reflected to the photodiode P, the greater the current (i.e., fingerprint signal) output by the photodiode P to the signal reading line. Because intensities of the light reflected to the photodiode P by the ridge line and the valley line on the surface of the finger are different, magnitudes of current read out by the reading signal lines at the positions of the ridge line and the valley line are different, thus realizing the detection of the valley line or the ridge line of the fingerprint.

It should be noted that the specific structure of the fingerprint recognition unit 1 shown in FIG. 2 is only for exemplary purposes, and does not limit the technical solution of the present disclosure; in the embodiment of the present disclosure, the fingerprint recognition unit 1 includes, but is not limited to, an optical fingerprint recognition unit, an ultrasonic fingerprint recognition unit, and a capacitive fingerprint recognition unit, and the specific structure of the fingerprint recognition unit is not limited in the technical solution of the present disclosure.

In the embodiment of the present disclosure, the fingerprint recognition units 1 and the signal reading lines RL are grouped along the row direction, and the switch circuits T_1~T_b are disposed between the signal reading lines RL and the corresponding signal transmission channels, so that the signal reading lines RL in different signal reading line groups can share a same signal transmission channel, thereby reducing the number of the signal transmission channels required to be configured in the array of the fingerprint recognition units 1, and reducing the requirement on the number of the signal transmission channels on the signal receiving unit 5.

In the embodiment of the present disclosure, since the length, in a column direction, of a fingerprint recognition region corresponding to the first fingerprint recognition group 2 is already determined, the length, in the row direction, of the fingerprint recognition region corresponding to the first fingerprint recognition group 2 can be controlled by controlling the number of columns of the fingerprint recognition units 1 included in each first fingerprint recognition group 2, so as to control the area of the fingerprint recognition region corresponding to the first fingerprint recognition group 2. As an alternative embodiment, the length, in the row direction, of the fingerprint recognition region corresponding to each first fingerprint recognition group 2 is slightly larger than the length of one complete fingerprint (which can be obtained through empirical data).

When the plurality of fingerprint recognition units 1 are grouped along the row direction, the number of columns of the fingerprint recognition units 1 included in each first fingerprint recognition group 2 may be individually designed, and the first fingerprint recognition groups 2 may include the same number or different numbers of columns of the fingerprint recognition units 1.

Figure 5:
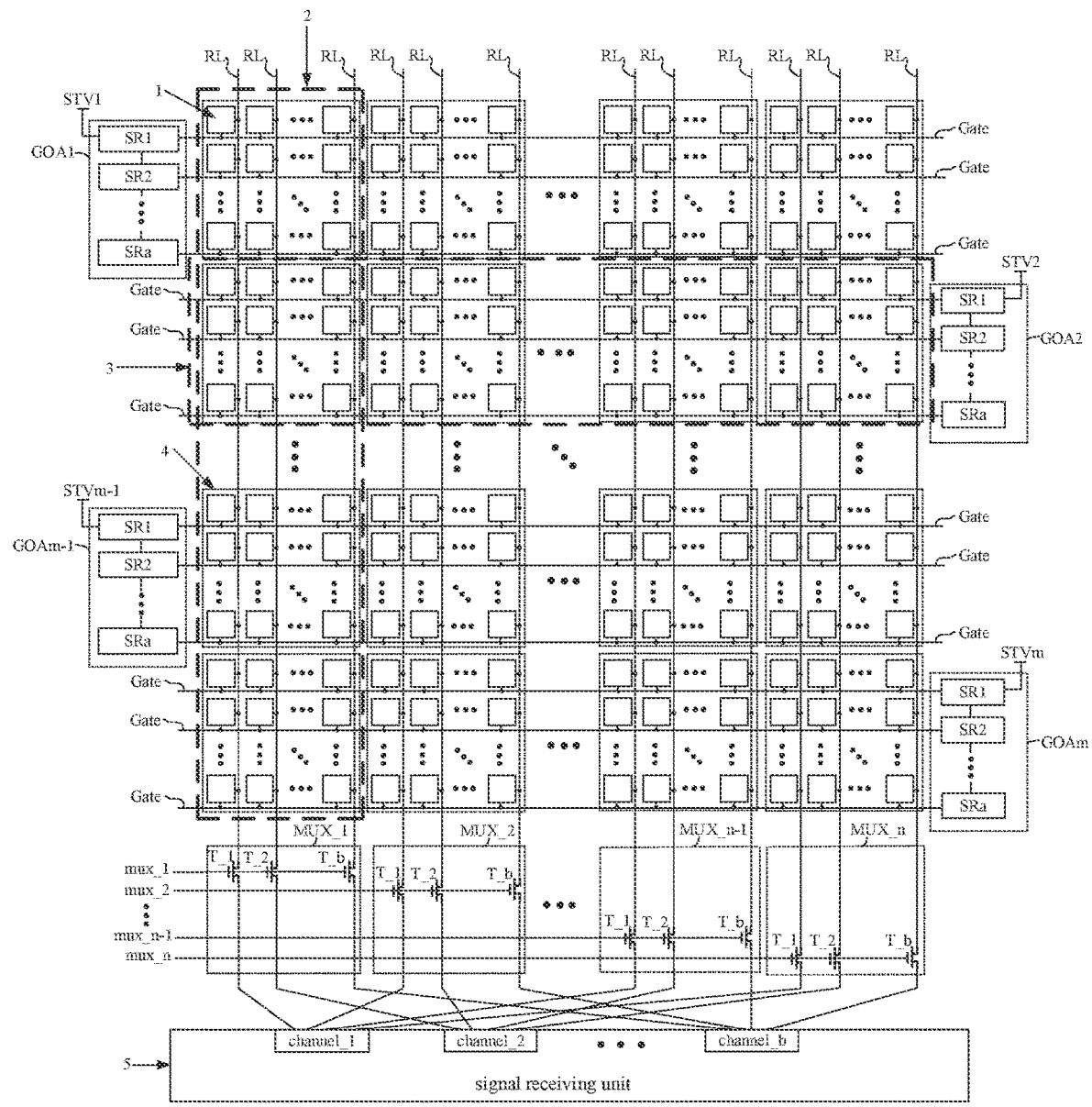
FIG. 5 is a schematic diagram of another circuit structure of a fingerprint recognition substrate according to an embodiment of the present disclosure.

FIG. 5 is a schematic diagram of another circuit structure of a fingerprint recognition substrate according to an embodiment of the present disclosure. As shown in FIG. 5, as an alternative embodiment, the number of columns of the fingerprint recognition units 1 in each first fingerprint recognition group 2 is the same, the number of signal reading lines RL in each signal reading line group 6 is the same, and each of the signal reading line groups 6 corresponds to the same number of signal transmission channels.

By taking the case shown in FIG. 5 as an example, the plurality of fingerprint recognition units 1 are grouped in the row direction to obtain n first fingerprint recognition groups 2, the number of the signal reading line groups 6 and the number of the gating circuits MUX_1~MUX_n are n, each first fingerprint recognition group 2 includes b columns of fingerprint recognition units 1, each signal reading line group 6 includes b signal reading lines RL, each of the gating circuits MUX_1~MUX_n includes b switch circuits T_1~T_b, and n signal reading line groups 6 correspond to b signal transmission channels channel_1~channel_b. As can be seen from this, only b signal transmission channels channel_1~channel_b need to be arranged for n×b signal reading lines RL, and in this case, each of the signal transmission channels channel_1~channel_b is coupled to n signal reading lines RL.

In some embodiments, the signal transmission channels on the signal receiving unit 5 are divided into at least two signal transmission channel groups, each signal reading line group 6 corresponds to one signal transmission channel group, and the number of signal transmission channels in the signal transmission channel group is greater than the number of signal reading lines RL in the corresponding signal reading line group 6. As an alternative embodiment, the number of signal transmission channels in each signal transmission channel group is the same.

In the embodiment of the present disclosure, the signal transmission channels on the signal receiving unit 5 may be grouped, and the signal reading line group 6 may be corresponded to the signal transmission channel group, so as to facilitate management and control of the signal transmission channels. It should be noted that the number of signal transmission channels in each signal transmission channel group may be the same or different, and it is only necessary to ensure that the number of signal transmission channels in the signal transmission channel group is greater than the number of signal reading lines RL in each corresponding signal reading line group 6; in addition, each signal transmission channel group may correspond to 0, 1, 2, or more signal reading line groups 6. Further, since there is a case in which at least two signal reading lines RL in different signal reading line groups 6 are coupled to a same signal transmission channel in the present disclosure, there must be at least one signal transmission channel group corresponding to two or more signal reading line groups 6.

Referring to FIG. 1, the plurality of signal reading line groups 6 are arranged in sequence in the row direction, and at least two signal transmission channel groups include: a first signal transmission channel group and a second signal transmission channel group; an odd-numbered signal reading line group 6 corresponds to the first signal transmission channel group; an even-numbered signal reading line group 6 corresponds to the second signal transmission channel group.

As an optional example, the first signal transmission channel group includes b signal transmission channels channel_1~channel_b, and the second signal transmission channel group includes b signal transmission channels channel_b+1~channel_2b.

Each first fingerprint recognition group 2 includes 54 columns of fingerprint recognition units 1, each signal reading line group 6 includes 54 signal reading lines RL, and each of the gating circuits MUX_1~MUX_n includes 54 switch circuits T_1~T_b; the signal receiving unit 5 has 108 signal transmission channels, which are respectively expressed as: channel_1~channel_108, channel_1~channel_54 are used as the first signal transmission channel group, and channel_55~channel_108 are used as the second signal transmission channel group (that is, the value of b is 54). The 54 signal reading lines RL in the odd-numbered signal reading line group 6 correspond to the 54 signal transmission channels in the first signal transmission channel group, and the 54 signal reading lines RL in the even-numbered signal reading line group 6 correspond to the 54 signal transmission channels in the second signal transmission channel group.

In some embodiments, all the signal reading lines RL in each signal reading line group 6 are arranged in sequence in the row direction; in all of the odd-numbered signal reading line groups 6, the signal reading lines RL having a same sequence number are coupled to a same signal transmission channel in the first signal transmission channel group; in all of the even-numbered signal reading line groups 6, the signal reading lines RL having a same sequence number are coupled to a same signal transmission channel in the second signal transmission channel group.

By taking the case shown in FIG. 1 as an example, in each odd-numbered signal reading line group 6, an i-th signal reading line RL is coupled to an i-th signal transmission channel in the first signal transmission channel group, and specifically, for the odd-numbered signal reading line group 6, the i-th signal reading line RL therein is coupled to the signal transmission channel channel_i. In each even-numbered signal reading line group 6, an i-th signal reading line RL is coupled to an i-th signal transmission channel in the second signal transmission channel group, and specifically, for the even-numbered signal reading line group 6, the i-th signal reading line RL therein is coupled to the signal transmission channel channel_i+54. Herein, i is an integer and is not less than 1 and not more than 54.

In some embodiments, the switch circuits T_1~T_b in one of the gating circuits MUX_1~MUX_n are coupled to one of control signal lines mux_1~mux_n, and the switch circuits T_1~T_b in different gating circuits MUX_1~MUX_n are coupled to different control signal lines mux_1~mux_n; the switch circuits T_1~T_b in one of the gating circuits MUX_1~MUX_n are configured to be turned on or off simultaneously under the control of a control signal provided by the same control signal line (one of mux_1~mux_n). With this arrangement, the number of control signal lines can be effectively reduced, wiring space is saved, and narrow bezel is facilitated.

Referring to FIGS. 1 and 5, in some embodiments, each of the switch circuits T_1~T_b includes: a switching transistor; a control electrode of the switching transistor is coupled to a corresponding one of the control signal lines mux_1~mux_n, a first electrode of the switching transistor is coupled to a corresponding signal reading lines RL, and a second electrode of the switching transistor is coupled to a corresponding signal transmission channel. The switching transistors in one of the gating circuits MUX_1~MUX_n can be turned on or off simultaneously under the control of one corresponding control signal line.

In the embodiment of the present disclosure, during the fingerprint recognition process, among the different gating circuits MUX_1~MUX_n corresponding to a same signal transmission channel group, at most one gating circuit is in a turned-on state at any time (the switch circuits T_1~T_b in one of the gating circuits MUX_1~MUX_n are simultaneously turned on), so as to transmit the signal on each signal reading line RL in the corresponding signal reading line group 6 to the signal receiving unit 5. Different gating circuits MUX_1~MUX_n corresponding to a same signal transmission channel group may be turned on sequentially at different times, so as to sequentially transmit the signals on the signal reading lines RL in different signal reading line groups 6 to the signal receiving unit 5. Based on the above technical means, the signal transmission channels can be used in a time-division manner.

In a display product, the fingerprint recognition driving and the image display driving are carried out in a time-staggered way, namely, in the fingerprint recognition driving process, the image display driving is suspended, and thus the time for implementing one complete fingerprint recognition process is required to be less than the refreshing time of one frame of display image in order to avoid that the overall display effect of the display product is influenced due to excessive time of the fingerprint recognition driving. Under the condition that the time t of the scan driving corresponding to one row of fingerprint recognition units 1 (line scan driving for short) is fixed, the time required for implementing one complete fingerprint recognition process is determined by the number of times that the line scan driving is carried out; in the related art, generally, the line scan driving is sequentially performed on each row of the fingerprint recognition units 1 on the fingerprint recognition substrate, however, as the number of rows of the fingerprint recognition units 1 increases, the time required for implementing one complete fingerprint recognition process increases, and is very likely to exceed the refreshing time of one frame of display image, resulting in poor display effect.

To overcome the above technical problems, embodiments of the present disclosure provide corresponding solutions, which will be described in detail below with reference to the accompanying drawings.

With continued reference to FIGS. 1 and 5, the plurality of fingerprint recognition units 1 are divided into a plurality of second fingerprint recognition groups 3 arranged along the column direction, and the fingerprint recognition substrate further includes: a plurality of gate driving circuits GOA1~GOAm and a plurality of scan driving line groups 7. The plurality of second fingerprint recognition groups 3 are in one-to-one correspondence with the plurality of scan driving line groups 7, and the plurality of scan driving line groups 7 are in one-to-one correspondence with the plurality of gate driving circuits GOA1~GOAm.

The second fingerprint recognition group 3 includes: a plurality of rows of fingerprint recognition units 1 consecutively arranged in the column direction, the scan driving line group 7 includes: a plurality of scan driving lines Gate which are in one-to-one correspondence with the plurality of rows of fingerprint recognition units 1 in a corresponding second fingerprint recognition group 3, and the scan driving line Gate is coupled to a corresponding row of fingerprint recognition units 1.

Each of the gate driving circuits GOA1~GOAm includes: a plurality of cascaded shift registers SR1~SRa in one-to-one correspondence with the plurality of scan driving lines Gate in a corresponding scan driving line group 7, and a signal output terminal of each of the shift registers SR1~SRa is coupled to a corresponding scan driving line Gate.

In the embodiment of the present disclosure, specific circuit structures of the shift registers SR1~SRa are not limited, and any existing circuit structure of the shift register may be adopted. For each of the gate driving circuits GOA1~GOAm, the shift register SR of the first stage therein is coupled to a corresponding one of the scan driving start signal terminals STV1~STVm. When one of the scan driving start signal terminals STV1~STVm provides an active signal, the corresponding one of the gate driving circuits GOA1~GOAm start to perform the progressive scan driving. The specific operation process of the gate driving circuit belongs to the conventional technology in the field, and is not described herein again.

In the embodiment of the present disclosure, since the length, in the row direction, of the fingerprint recognition region corresponding to the second fingerprint recognition group 3 is already determined, the length, in the column direction, of the fingerprint recognition region corresponding to the second fingerprint recognition group 3 can be controlled by controlling the number of rows of the fingerprint recognition units 1 included in each second fingerprint recognition group 3, so as to control the area of the fingerprint recognition region corresponding to the second fingerprint recognition group 3. As an alternative embodiment, the length in the column direction of the fingerprint recognition region corresponding to each second fingerprint recognition group 3 is slightly greater than the length of one complete fingerprint, and this is designed to ensure that when progressive line scan driving is performed on the rows of fingerprint recognition units 1 in each second fingerprint recognition group 3, at most one fingerprint recognition unit 1 among the fingerprint recognition units 1 in the same column outputs an active fingerprint signal at any time.

In practical applications, when the plurality of fingerprint recognition units 1 are grouped in the column direction, the number of rows of the fingerprint recognition units 1 included in each second fingerprint recognition group 3 may be designed individually, and the number of rows of the fingerprint recognition units 1 included in each second fingerprint recognition group 3 may be the same or different.

With continued reference to FIGS. 1 and 5, in some embodiments, the number of rows of the fingerprint recognition units 1 in each second fingerprint recognition group 3 is the same, and the number of scan driving lines Gate in each scan driving line group 7 is the same.

In the embodiment of the present disclosure, the fingerprint recognition units 1 and the scan driving lines Gate are grouped in the column direction, and each second fingerprint recognition group 3 corresponds to one scan driving line group 7 and one gate driving circuit, so that scan driving can be individually performed on each second fingerprint recognition group 3.

As an optional driving method, scan driving may be performed only on the second fingerprint recognition group 3 having a fingerprint recognition region overlapping a fingerprint area.

As another optional driving method, when the length in the column direction of the fingerprint recognition region corresponding to each second fingerprint recognition group 3 is slightly greater than the length of one complete fingerprint, all the gate driving circuits GOA1~GOAm may be controlled to start scan driving synchronously. It should be noted that, in the process of synchronously starting the scan driving by the gate driving circuits GOA1~GOAm, since the length in the column direction of the fingerprint recognition region corresponding to the second fingerprint recognition group 3 is slightly larger than the length of one complete fingerprint, at most one fingerprint recognition unit 1 among the fingerprint recognition units 1 located in a same column and driven simultaneously outputs a fingerprint signal, and the other fingerprint recognition units 1 in the column do not output a fingerprint signal even if they are being driven because they are not covered by a fingerprint, so that the problem of crosstalk of a plurality of fingerprint signals is not generated.

In some embodiments, the plurality of scan driving line groups 7 are arranged in sequence in the column direction; the gate driving circuits GOA1, GOA3 . . . coupled to the odd-numbered scan driving line groups 7 are located at a first side of the corresponding scan driving line groups 7, the gate driving circuits GOA2, GOA4 . . . coupled to the even-numbered scan driving line groups 7 are located at a second side of the corresponding scan driving line groups 7, and the first side and the second side are opposite sides of the scan driving line group 7 in the row direction. The gate driving circuits GOA1~GOAm are uniformly arranged on the two opposite sides of the fingerprint recognition substrate in the row direction, so that the space that can be occupied by each of the gate driving circuits GOA1~GOAm can be increased, and the layout design is facilitated.

Figure 6:
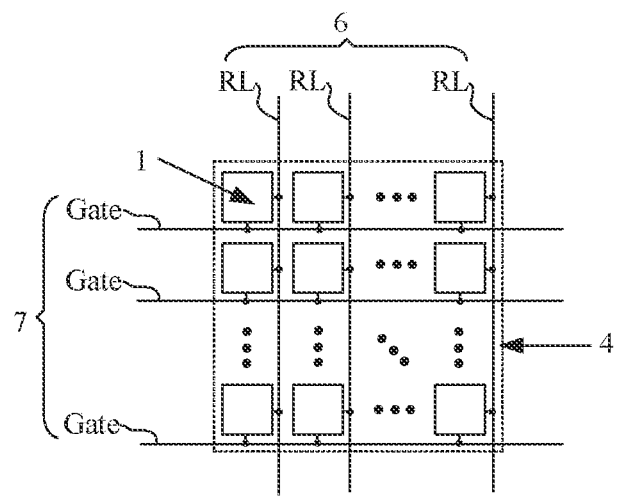
FIG. 6 is a schematic diagram of a circuit structure of a fingerprint recognition block according to an embodiment of the present disclosure.

FIG. 6 is a schematic diagram of a circuit structure of a fingerprint recognition block according to an embodiment of the present disclosure. As shown in FIGS. 1, 5 and 6, after the plurality of fingerprint recognition units 1 are divided into the first fingerprint recognition groups 2 along the row direction and the second fingerprint recognition groups 3 along the column direction, a plurality of fingerprint recognition blocks 4 arranged in an array can be obtained. As an example, the number of the first fingerprint recognition groups 2 and the number of the gating circuits MUX_1~MUX_n is n, each first fingerprint recognition group 2 includes b columns of fingerprint recognition units 1, the number of the second fingerprint recognition groups 3 is m, each second fingerprint recognition group 3 includes a rows of fingerprint recognition units 1, in this case, m×n fingerprint recognition blocks 4 are obtained, each fingerprint recognition block 4 includes a total of a×b fingerprint recognition units 1 in a rows and b columns, and each of the gating circuits MUX_1~MUX_n includes b switch circuits; the values of a and b can be set according to actual conditions. In practical applications, values of a and b are set such that a fingerprint recognition region corresponding to one fingerprint recognition block 4 can completely contain one complete fingerprint (parameters of the complete fingerprint can be obtained through empirical data).

The embodiments of the present disclosure further provide a fingerprint recognition driving method, the fingerprint recognition driving method is based on the fingerprint recognition substrate provided in the foregoing embodiments, and the fingerprint recognition driving method includes step S1.

In step S1, all switch circuits in the gating circuit corresponding to the first fingerprint recognition group with a fingerprint recognition region overlapping with a fingerprint area are turned on, and the switch circuits in the turned-on state transmit detection signals in the signal reading lines coupled thereto to corresponding signal transmission channels.

When two or more first fingerprint recognition groups have fingerprint recognition regions overlapping with the fingerprint area, and any two of the two or more first fingerprint recognition groups correspond to different transmission channel groups, all the switch circuits in the gating circuits corresponding to the two or more first fingerprint recognition groups may be simultaneously turned on.

When two or more first fingerprint recognition groups have fingerprint recognition regions overlapping with the fingerprint area, at least two of the two or more first fingerprint recognition groups correspond to a same transmission channel group, the gating circuits coupled to the at least two first fingerprint recognition groups corresponding to the same transmission channel group need to be sequentially turned on in each line scan driving stage.

Figure 7:
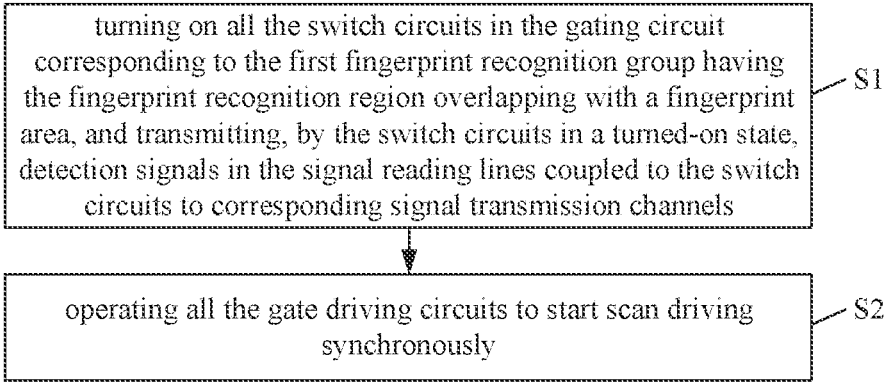
FIG. 7 is a flow chart of another fingerprint recognition driving method according to an embodiment of the present disclosure.

FIG. 7 is a flow chart of another fingerprint recognition driving method according to an embodiment of the present disclosure, and as shown in FIG. 7, the fingerprint recognition driving method is based on the fingerprint recognition substrate provided in the foregoing embodiments, in which the plurality of fingerprint recognition units on the fingerprint recognition substrate are divided into the plurality of second fingerprint recognition groups arranged along the column direction, the second fingerprint recognition groups are in one-to-one correspondence with the scan driving line groups, and the scan driving line groups are in one-to-one correspondence with the gate driving circuits. The fingerprint recognition driving method includes steps S1 and S2.

In step S1, all switch circuits in the gating circuit corresponding to the first fingerprint recognition group with a fingerprint recognition region overlapping with a fingerprint area are turned on, and the switch circuits in the turned-on state transmit detection signals in the signal reading lines coupled thereto to corresponding signal transmission channels.

In step S2, all the gate driving circuits start scan driving in synchronization with each other.

Step S1 is performed in synchronization with step S2.

By taking the case shown in FIG. 1 as an example, as an optional fingerprint recognition driving method, the fingerprint area is positioned in advance (by a touch function module in a display product) so as to determine the first fingerprint recognition group(s) with the fingerprint recognition region overlapping with the fingerprint area and the corresponding gating circuit(s). In the process of fingerprint recognition driving, all the gate driving circuits synchronously start scan driving, and in each line scan driving stage, the determined gating circuit(s) are simultaneously or sequentially turned on by providing a corresponding control signal to the determined gating circuit (s) (if the determined gating circuits are multiple and at least two gating circuits correspond to a same transmission channel group, the at least two gating circuits corresponding to the same transmission channel group need to be sequentially turned on).

As another optional fingerprint recognition driving method, in the process of fingerprint recognition driving, all the gate driving circuits start scan driving synchronously, and in each line scan driving stage, all the gating circuits are turned on in sequence, and in this process, a step of turning on the gating circuit corresponding to the first fingerprint recognition group with the fingerprint recognition region overlapping with the fingerprint area must exist. The advantage of this driving method is that it is not required to position the fingerprint area in advance.

It should be noted that, when the fingerprint area is positioned in advance, the second fingerprint recognition group(s) with a fingerprint recognition region overlapping with the fingerprint area, and the corresponding gate driving circuit(s) may be determined. In the fingerprint recognition driving process, only the predetermined gate driving circuit (s) need to be controlled to perform scan driving (when two or more gate driving circuits are determined, the determined two or more gate driving circuits may perform scan driving synchronously or sequentially), and the other gate driving circuits do not perform scan driving.

The embodiments of the present disclosure further provide a display device, including: a fingerprint recognition substrate, this fingerprint recognition substrate is the fingerprint recognition substrate provided in any of the forgoing embodiments.

In some embodiments, the display device further includes: a display function module, which may be a liquid crystal display function module or an organic light-emitting display function module, and the display function module and the fingerprint recognition substrate may be on a same substrate or on different substrates. In addition, the display device may also include a touch function module. The specific structures of the display function module and the touch function module and the integration with the fingerprint recognition substrate belong to the conventional technical contents in the field, and are not described herein again.

The display device provided in the embodiments of the present disclosure may be other structure or device having a display function, such as a computer, a television, and a vehicle-mounted display device, or the like, and the present disclosure is not limited thereto. The display device provided in the embodiments of the present disclosure has the beneficial effects of the fingerprint recognition substrate provided in the embodiments of the present disclosure, and specific descriptions of the fingerprint recognition substrate in the above embodiments can be specifically referred to, and details are not repeated herein.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

What is claimed is:

1. A fingerprint recognition substrate, comprising: a plurality of fingerprint recognition units arranged in an array, a plurality of signal reading line groups and a plurality of gating circuits, wherein the plurality of fingerprint recognition units are divided into a plurality of first fingerprint recognition groups arranged along a row direction, the plurality of first fingerprint recognition groups are in one-to-one correspondence with the plurality of signal reading line groups, and the plurality of signal reading line groups are in one-to-one correspondence with the plurality of gating circuits;

the first fingerprint recognition group comprises: a plurality of columns of fingerprint recognition units consecutively arranged in the row direction, the signal reading line group comprises: a plurality of signal reading lines which are in one-to-one correspondence with the plurality of columns of fingerprint recognition units in a corresponding first fingerprint recognition group, and the signal reading line is coupled to a corresponding column of fingerprint recognition units;

the gating circuit comprises: a plurality of switch circuits which are in one-to-one correspondence with the plurality of signal reading lines in a corresponding signal reading line group, each signal reading line is coupled to one signal transmission channel on a signal receiving unit through a corresponding switch circuit, and the switch circuit is configured to control connection/disconnection between the signal reading line and the signal transmission channel coupled to the switch circuit;

among all the signal reading lines, different signal reading lines in a same signal reading line group are coupled to different signal transmission channels, and at least two signal reading lines in different signal reading line groups are coupled to a same signal transmission channel; and the signal transmission channels on the signal receiving unit are divided into at least two signal transmission channel groups, each signal reading line group corresponds to one signal transmission channel group, a number of the signal transmission channels in the signal transmission channel group is greater than a number of the signal reading lines in the signal reading line group corresponding to the signal transmission channel group, and a fingerprint recognition region corresponding to each signal reading line group has a length in the row direction greater than a length of a complete fingerprint.

2. The fingerprint recognition substrate of claim 1, wherein a number of columns of the fingerprint recognition units in each first fingerprint recognition group is the same; and a number of the signal reading lines in each signal reading line group is the same.

3. The fingerprint recognition substrate of claim 2, wherein the plurality of the signal reading line groups are arranged in sequence in the row direction, and the at least two signal transmission channel groups comprise: a first signal transmission channel group and a second signal transmission channel group;

an odd-numbered signal reading line group corresponds to the first signal transmission channel group; and an even-numbered signal reading line group corresponds to the second signal transmission channel group.

4. The fingerprint recognition substrate of claim 3, wherein the plurality of signal reading lines in each signal reading line group are arranged in sequence in the row direction;

in all the odd-numbered signal reading line groups, the signal reading lines having a same sequence number are coupled to a same signal transmission channel in the first signal transmission channel group; and in all the even-numbered signal reading line groups, the signal reading lines having a same sequence number are coupled to a same signal transmission channel in the second signal transmission channel group.

5. The fingerprint recognition substrate of claim 1, wherein a number of the signal transmission channels in each signal transmission channel group is the same.

6. The fingerprint recognition substrate of claim 1, wherein the plurality of switch circuits in a same gating circuit are coupled to a same control signal line, and the switch circuits in different gating circuits are coupled to different control signal lines; and the plurality of switch circuits in the same gating circuit are configured to be simultaneously turned on or off under control of a control signal provided by the same control signal line.

7. The fingerprint recognition substrate of claim 6, wherein the switch circuit comprises: a switching transistor;

a control electrode of the switching transistor is coupled to a corresponding control signal line, a first electrode of the switching transistor is coupled to a corresponding signal reading line and a second electrode of the switching transistor is coupled to a corresponding signal transmission channel.

8. The fingerprint recognition substrate of claim 1, wherein the plurality of fingerprint recognition units are divided into a plurality of second fingerprint recognition groups arranged along a column direction, and the fingerprint recognition substrate further comprises: a plurality of gate driving circuits and a plurality of scan driving line groups, the plurality of second fingerprint recognition groups are in one-to-one correspondence with the plurality of scan driving line groups, and the plurality of scan driving line groups are in one-to-one correspondence with the plurality of the gate driving circuits;

the second fingerprint recognition group comprises: a plurality of rows of fingerprint recognition units consecutively arranged in the column direction, the scan driving line group comprises: a plurality of scan driving lines which are in one-to-one correspondence with the plurality of rows of fingerprint recognition units in a corresponding second fingerprint recognition group, and the scan driving line is coupled to a corresponding row of fingerprint recognition units; and the gate driving circuit comprises: a plurality of cascaded shift registers in one-to-one correspondence with the plurality of scan driving lines in a corresponding scan driving line group, and a signal output terminal of the shift register is coupled to a corresponding scan driving line.

9. The fingerprint recognition substrate of claim 8, wherein the plurality of scan driving line groups are sequentially arranged in the column direction;

the gate driving circuit coupled to an odd-numbered scan driving line group are at a first side of a corresponding scan driving line group, the gate driving circuit coupled to an even-numbered scan driving line group is at a second side of a corresponding scan driving line group, and the first side and the second side are opposite sides of the scan driving line group in the row direction.

10. The fingerprint recognition substrate of claim 8, wherein a number of rows of the fingerprint recognition units in each second fingerprint recognition group is the same; and a number of the scan driving lines in each scan driving line group is the same.

11. A display device, comprising the fingerprint recognition substrate of claim 1.

12. A fingerprint recognition driving method based on a fingerprint recognition substrate, wherein the fingerprint recognition substrate is the fingerprint recognition substrate of claim 1, each first fingerprint recognition group has a corresponding fingerprint recognition region, and the driving method comprises:

turning on all the switch circuits in the gating circuit corresponding to the first fingerprint recognition group having the fingerprint recognition region overlapping with a fingerprint area, and transmitting, by the switch circuits in a turned-on state, detection signals in the signal reading lines coupled to the switch circuits to corresponding signal transmission channels.

13. The fingerprint recognition driving method of claim 12, wherein the plurality of fingerprint recognition units are divided into a plurality of second fingerprint recognition groups arranged along a column direction, and the fingerprint recognition substrate further comprises: a plurality of gate driving circuits and a plurality of scan driving line groups, the plurality of second fingerprint recognition groups are in one-to-one correspondence with the plurality of scan driving line groups, and the plurality of scan driving line groups are in one-to-one correspondence with the plurality of the gate driving circuits;

the second fingerprint recognition group comprises: a plurality of rows of fingerprint recognition units consecutively arranged in the column direction, the scan driving line group comprises: a plurality of scan driving lines which are in one-to-one correspondence with the plurality of rows of fingerprint recognition units in a corresponding second fingerprint recognition group, and the scan driving line is coupled to a corresponding row of fingerprint recognition units;

the gate driving circuit comprises: a plurality of cascaded shift registers in one-to-one correspondence with the plurality of scan driving lines in a corresponding scan driving line group, and a signal output terminal of the shift register is coupled to a corresponding scan driving line, and the driving method comprises:

operating all the gate driving circuits to start scan driving synchronously.

* * * * *